UNITED STATES PATENT OFFICE.

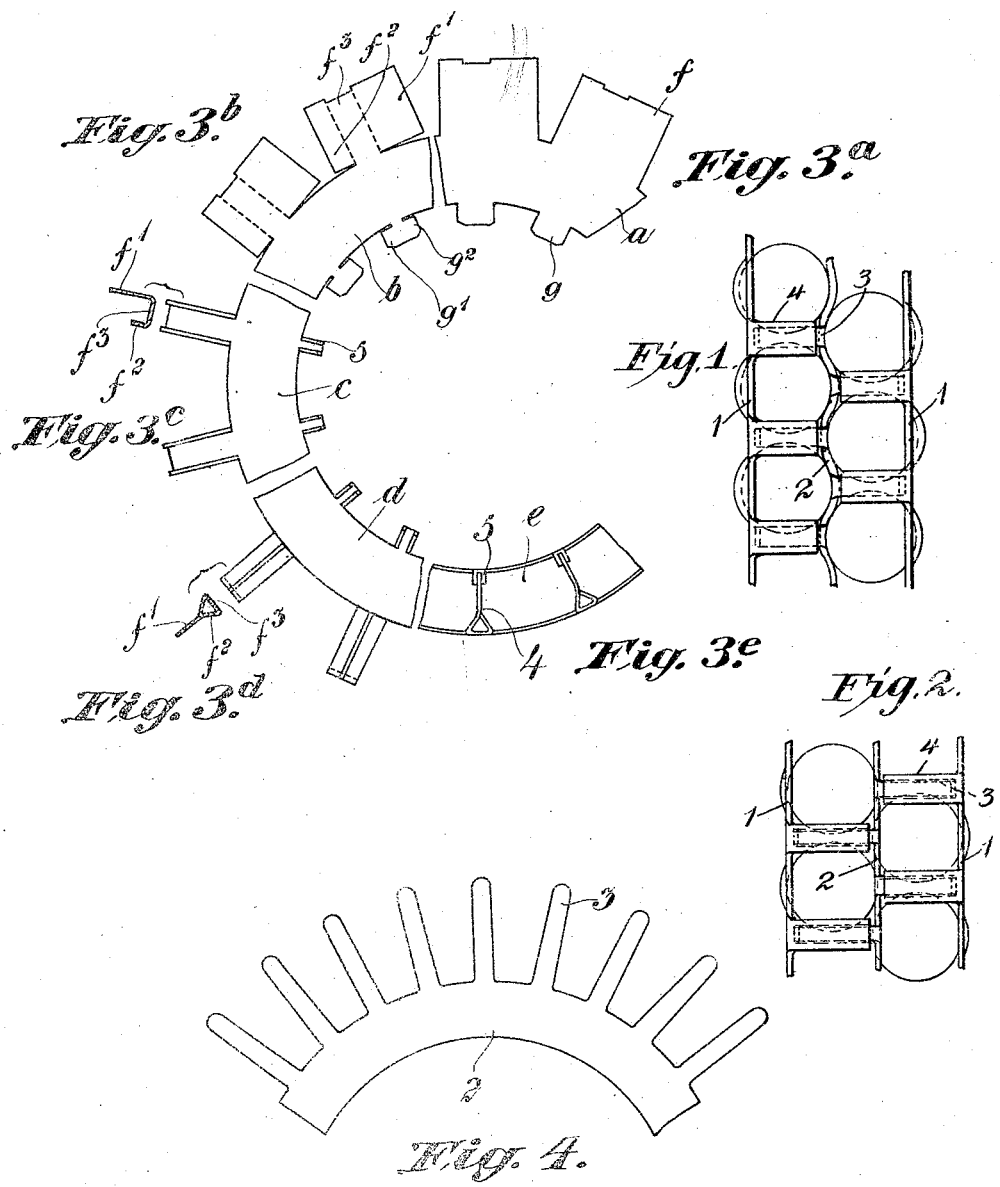

VICTOR EMANUEL WESTERBERG, OF GOTTENBORG, SWEDEN, ASSIGNOR, BY MESNE ASSIGNMENTS, TO S. K. F. BALL BEARING COMPANY, OF HARTFORD, CONNECTICUT, A CORPORATION OF CONNECTICUT.

BALL-CAGE FOR BALL-BEARINGS.

1,211,903.   Specification of Letters Patent.   Patented Jan. 9, 1917.

Application filed September 3, 1915. Serial No. 48,757.

*To all whom it may concern:*

Be it known that I, VICTOR EMANUEL WESTERBERG, a citizen of the Kingdom of Sweden, residing at Gottenborg, Sweden, have invented new and useful Improvements in Ball-Cages for Ball-Bearings, of which the following is a specification.

This invention relates to ball cages for ball bearings having two rows of balls and has for its object to provide a ball cage of this character which is simple and strong in construction and which may yield to some extent for the pressure of the balls, thereby reducing the friction between the balls and the ball cage to a minimum.

With these and other objects in view the invention consists, chiefly, in the combination with two rings of sheet-metal adapted to be placed outside the two rows of balls and provided with means to keep the balls apart, of a ring adapted to be inserted between the two rows of balls and provided with means for securing the outer rings together.

Other details of the invention are hereinafter described and the novel features are pointed out in the claims.

In the accompanying drawings, Figure 1 shows a part of a ball cage the intermediate ring of which being corrugated to form seats for the balls. Fig. 2 shows a part of a ball cage with a plane intermediate ring. Figs. 3$^a$, 3$^b$, 3$^c$, 3$^d$, and 3$^e$ show segments of an outer cage ring in different progressive stages of manufacture. Fig. 4 shows a part of the intermediate ring.

The ball cage consists of two outer rings 1 of sheet-metal and an intermediate ring 2, likewise formed of sheet-metal. Each ring 1 is provided, at its outer edge, with channel-shaped projections 4, while the intermediate ring 2 is provided with tongues 3 bent alternately to the one side and the other and engaging said channel-shaped projections 4 thereby securing the rings 1 together. The form and arrangement of the projections 4 are shown in the Fig. 3 group in which the segments $a$, $b$, $c$, $d$, $e$ illustrate different stages of the manufacture of the sheet-metal ring 1. The first operation (see part $a$) consists in stamping out a ring of sheet-metal formed, at its outer edge, with projections $f$ which are adapted to form the channel-shaped projections 4, and provided, at its inner edge, with other projections $g$ adapted to form ears 5 to retain the projections 4 of the finished cage ring in position. The second operation (see part $b$) involves the cutting out of the wings $f^1$ $f^2$ from the projections $f$ as well as the forming of the lateral laps $g^1$ $g^2$ of the projections $g$ at the inner circumference of the ring-shaped portion 1. In the third operation (see part $c$) the wings $f^1$ $f^2$ and laps $g^1$ $g^2$ are bent at right angles to the surface of the ring-shaped portion 1. In the fourth operation (see part $d$) the larger wing $f^1$ is folded on its base line while the smaller wing $f^2$ is bent toward the larger wing thereby forming at the inside of the bracket $f^3$ a triangular opening to receive one of the tongues extending from the intermediate ring 2. Thus, the projections 4 as well as the ears 5 are finished. In the fifth and last operation (see part $e$) the edges of the ring-shaped portion are turned up so that the projections 4 and ears 5 will lie at right angles to the surface of the ring portion and the wing $f^1$ of each projection 4 will enter and be held in position by the oppositely situated ears 5. The outer ring is now finished.

In manufacturing the intermediate ring 2 a ring-shaped portion having a number of tongues 3 corresponding to the total number of projections of the two rings 1 is first stamped out from a sheet-metal piece. The tongues are then bent at right angles to the surface of the ring-shaped portion, alternately to the one side and the other. In or before the bending operation the tongues 3 may be strengthened by forming them with a triangular cross-section at their base-portion and along a desired part of their length. Furthermore, the end of each tongue may be bent so as to form a bill in order to facilitate the assembling of the ball cage. The ring 2 may be corrugated, as shown in Fig. 1, to form seats for the balls, or plane, as shown in Fig. 2, and provided with apertures serving as seats for the balls.

In assembling the ball cage the ring 2 is placed in position in the bearing, whereupon the desired number of balls are inserted in the bearing from opposite sides of said ring. The rings 1 are then placed outside the rows of balls in such a manner that the tongues 3 will lie opposite the triangular openings formed by the projections or separators 4. The rings 1 are then pressed together thereby causing the tongues 3 to enter said triangular openings and strike the ring-shaped portions 1. By further pressure the ends of the tongues will be bent so that they will lie closely against the inner surface of said ring-shaped portions 1 and will enter the opening between said inner surface and the wings $f^1$ $f^2$ of the projections 4 thereby rigidly securing the rings 1 together.

It should be noted that modifications may be made in details without departing from the principle of the invention.

Having thus described the nature of my invention, what I claim as new, and desire to secure by Letters Patent, is—

1. A ball cage for ball bearings having two rows of the balls, comprising two rings of sheet-metal having means for separating the balls and placed outside the ball rows, and a third ring, likewise of sheet-metal, disposed between said outer rings and provided with means for securing said outer rings together, substantially as described.

2. A ball cage for ball bearings having two rows of balls, comprising two rings of sheet-metal having means for separating the balls and a third ring of sheet-metal adapted to secure the outer rings together, the means for separating the balls consisting of wings extending across the rings and supported by brackets bent at right angles from the edges of the rings, substantially as described.

3. A ball cage for ball bearings having two rows of balls, comprising two rings of sheet-metal, placed outside the rows of balls and a third ring of sheet-metal disposed between the rows of balls, the first-mentioned rings being provided with wings to separate the balls and brackets to support said wings and further provided with means to retain said wings in position.

4. A ball cage for ball bearings having two rows of balls, comprising two rings of sheet-metal, placed outside the rows of balls and a third ring of sheet-metal disposed between the rows of balls and having means for securing said rings together, the first mentioned rings being provided with wings to separate the balls and brackets supporting said wings and further provided with ears engaging the ends of the wings to retain the latter in position, substantially as described.

5. A ball cage for ball bearings having two rows of balls, comprising two outer rings of sheet-metal having wings for separating the balls, and an intermediate third ring of sheet-metal having tongues for securing the outer rings together, said tongues extending from the outer edge of the intermediate ring and being bent alternately to the one side and the other.

6. A ball cage for ball bearings having two rows of balls, comprising two outer rings of sheet-metal having wings for separating the balls, and an intermediate ring having tongues for securing the outer rings together, said wings being folded so as to form openings to receive the tongues of the intermediate ring.

7. A ball cage for ball bearings having two rows of balls, comprising two outer rings having wings to separate the balls, and an intermediate ring having tongues for securing the outer rings together and formed with seats for the balls.

In testimony whereof I, the said VICTOR EMANUEL WESTERBERG, have hereunto set my hand in the presence of two subscribing witnesses.

VICTOR EMANUEL WESTERBERG.

Witnesses:
IVAR LAISFAN,
DANITZ RYDBECK.